United States Patent
Matsumura

(10) Patent No.: US 11,039,042 B2
(45) Date of Patent: Jun. 15, 2021

(54) NETWORK SYSTEM, TRANSMISSION APPARATUS, AND RECEPTION APPARATUS

(71) Applicants: Kabushiki Kaisha Toshiba, Minato-ku (JP); Toshiba Electronic Devices & Storage Corporation, Minato-ku (JP)

(72) Inventor: Shigeyuki Matsumura, Kokubunji (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 12 days.

(21) Appl. No.: 16/740,544

(22) Filed: Jan. 13, 2020

(65) Prior Publication Data

US 2021/0075936 A1 Mar. 11, 2021

(30) Foreign Application Priority Data

Sep. 6, 2019 (JP) .............................. JP2019-163394

(51) Int. Cl.
*H04N 5/04* (2006.01)
*H04N 5/44* (2011.01)
*H04N 5/38* (2006.01)

(52) U.S. Cl.
CPC ................. *H04N 5/04* (2013.01); *H04N 5/38* (2013.01); *H04N 5/44* (2013.01)

(58) Field of Classification Search
None
See application file for complete search history.

(56) References Cited

U.S. PATENT DOCUMENTS

| | | | |
|---|---|---|---|
| 8,619,803 B2 | 12/2013 | Gunther et al. | |
| 8,699,646 B2 | 4/2014 | Olsen et al. | |
| 9,451,313 B2 | 9/2016 | Hutchings et al. | |
| 10,038,827 B2 | 7/2018 | Takitsune et al. | |
| 10,038,935 B2 | 7/2018 | Selvaiyya et al. | |
| 2013/0235878 A1* | 9/2013 | Hirota | H04L 49/90 370/412 |
| 2017/0244477 A1* | 8/2017 | Seo | H04L 12/40 |
| 2018/0287688 A1* | 10/2018 | Otsu | H04L 7/00 |
| 2018/0295031 A1* | 10/2018 | Holness | H04L 43/0852 |

(Continued)

FOREIGN PATENT DOCUMENTS

| | | |
|---|---|---|
| JP | 2012-227927 A | 11/2012 |
| JP | 5526186 B2 | 6/2014 |

(Continued)

*Primary Examiner* — James R Marandi
(74) *Attorney, Agent, or Firm* — Oblon, McClelland, Maier & Neustadt, L.L.P.

(57) ABSTRACT

According to an embodiment, in a network system 1 in which at least one data of the audio data and the video data is transmitted from a first node to a second node through a network, the second node includes a processor configured to generate a clock signal for reproduction of the audio data and the like. The processor is configured to synchronize a current time in the second node with a current time in the first node, based on a transmission time that is based on the current time in the first node and is contained in a received extended CRF frame, a reception time that is based on the current time in the second node and at which the extended CRF frame is received, and a delay time period occurring while the extended CRF frame is transmitted from the first node to the second node.

15 Claims, 11 Drawing Sheets

(56) References Cited

U.S. PATENT DOCUMENTS

2018/0309906 A1    10/2018  Takitsune et al.
2019/0158204 A1*    5/2019  Luo ..................... H04J 3/0644

FOREIGN PATENT DOCUMENTS

| JP | 2016-123009 A | 7/2016 |
| JP | 6245795 B2 | 12/2017 |
| JP | 6430978 B2 | 11/2018 |
| JP | 6503271 B2 | 4/2019 |

* cited by examiner

NETWORK SYSTEM, TRANSMISSION APPARATUS, AND RECEPTION APPARATUS

CROSS-REFERENCE TO RELATED APPLICATION

This application is based upon and claims the benefit of priority from the prior Japanese Patent Application No. 2019-163394 filed in Japan on Sep. 6, 2019; the entire contents of which are incorporated herein by reference.

FIELD

Embodiments described herein relate generally to a network system, a transmission apparatus, and a reception apparatus.

BACKGROUND

Network systems are known in which the audio data and the video data are transmitted and received between a plurality of apparatuses. In such network systems, the apparatuses include a time synchronization function in order to implement various functions.

However, the audio data output and the like cannot be made before activation of a protocol for time synchronization is completed, and processing for outputting the audio data and the like cannot be promptly performed when processing for the protocol for time synchronization takes time.

DETAILED DESCRIPTION

A network system according to an embodiment is a network system in which at least one data of the audio data and the video data is transmitted from a first apparatus to a second apparatus through a network, wherein the first apparatus includes: a first current time keeping circuit configured to keep a first current time; a first clock generation circuit configured to generate a first clock signal for reproduction of the at least one data; and a first processor configured to transmit a predetermined frame at a first timing, and to transmit, to the second apparatus through the network at the first timing, the predetermined frame containing a transmission time that is based on the first current time and at which the predetermined frame is transmitted at a second timing that is previous to the first timing, and the second apparatus includes: a second current time keeping circuit configured to keep a second current time; a second clock generation circuit configured to generate a second clock signal for reproduction of the at least one data; and a second processor configured to receive the predetermined frame through the network and to synchronize the second current time with the first current time based on the transmission time contained in the predetermined frame, a reception time that is based on the second current time and at which the predetermined frame transmitted at the second timing is received at a third timing, and a delay time period that is contained in the predetermined frame and occurs while the predetermined frame is transmitted from the first apparatus to the second apparatus through the network.

Hereinafter, embodiments will be described with reference to drawings.

First Embodiment (Configuration)
[1] System Configuration

Figure 1:
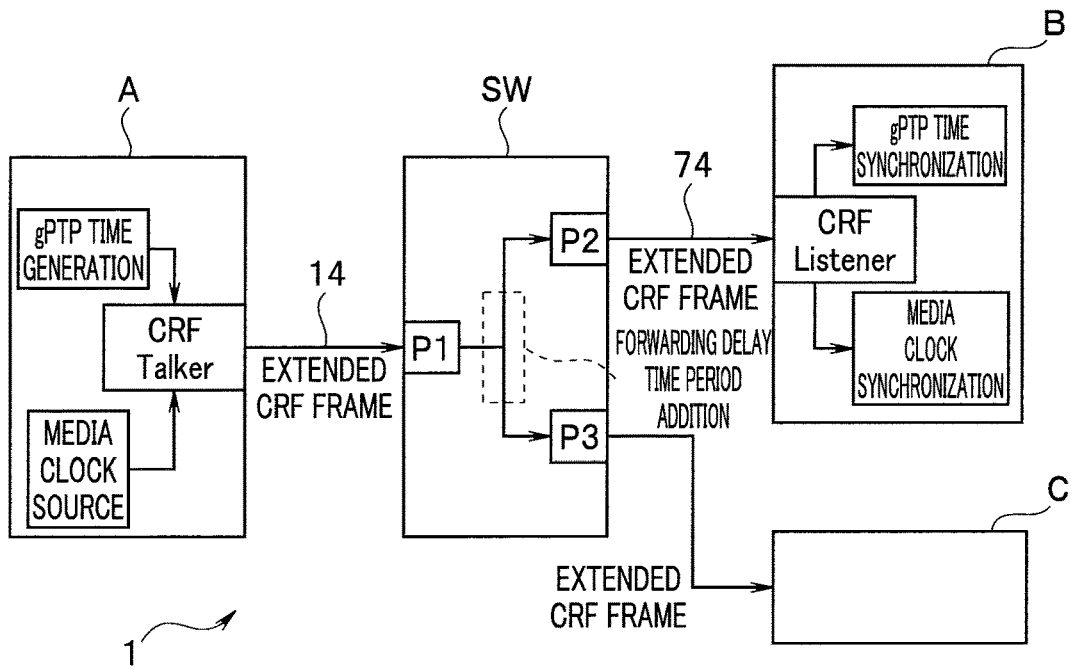
FIG. 1 is a functional block configuration diagram of a network system according to a first embodiment.

First, a schematic functional configuration of a network system according to the present embodiment will be described. FIG. 1 is a functional block configuration diagram of the network system according to the present embodiment. The network system 1 includes nodes A, B, and C and a switch SW that are connected to each other through an Ethernet line, and the audio data and the video data can be transmitted and received between the nodes. In the network system 1, time synchronization and media clock synchronization can be performed between a plurality of apparatuses such as the node A.

The network system 1 is, for example, an in-vehicle AVB (audio/video bridging) network system for audio reproduction. The network system 1 is a communication system using IEEE 802.3, which is a set of standards for wired Ethernet communication. Here, the network is a star Ethernet line.

In the present embodiment, the node A transmits the audio data and the video data to each of the nodes B and C via the switch SW, and the audio data and the video data are reproduced at the nodes B and C. The node A is a transmission apparatus, and each of the nodes B and C is a reception apparatus.

Note that although the audio data and the video data are transmitted from the transmission apparatus to the reception apparatus in the present embodiment, any one data of the audio data and the video data may be transmitted, and the video data may include not only moving image data but also still image data. Accordingly, the network system 1 is a system in which at least one data of the audio data and the video data is transmitted from the transmission apparatus to the reception apparatus through a network.

The switch SW includes a plurality of (here, three) ports P1, P2, and P3. An Ethernet frame inputted to the port P1 is supplied to each of the ports P2 and P3 and outputted from the ports P2 and P3. The switch SW includes a forwarding delay time period addition function, as indicated by a dotted line. The forwarding delay time period addition function will be described later.

The node A includes a media clock source function serving as a time reference for recording, reproduction, and the like of the audio data and the video data, a generalized Precision Time Protocol (gPTP) time generation function, and a CRF (clock recovery format) talker function.

The node B includes a media clock synchronization function, a gPTP time synchronization function, and a CRF listener function. The node B performs processing of receiving an extended CRF frame, which will be described later, synchronizing an own gPTP clock with a gPTP clock of the node A, and synchronizing an own media clock with the media clock source of the node A. The node C also has a configuration similar to the configuration of the node B and performs gPTP time synchronization and media clock synchronization.

In other words, the node A is a master apparatus, includes a master media clock, and includes a CRF talker function. Each of the nodes B and C is a slave apparatus, includes the CRF listener function, generates a gPTP time synchronized with a master gPTP time, and also includes the media clock synchronization function that achieves synchronization with the media clock of the node A.

At the nodes B and C, the gPTP time and the media clock come into synchronization with the gPTP time and the media clock of the node A, respectively, whereby the audio data and the video data transmitted from the master node A are correctly reproduced at the slave nodes B and C.

In the present embodiment, an extended CRF frame is used in order to generate the gPTP time synchronized with the master gPTP time and to generate the media clock synchronized with the media clock of the node A at the nodes B and C.

Figure 2:
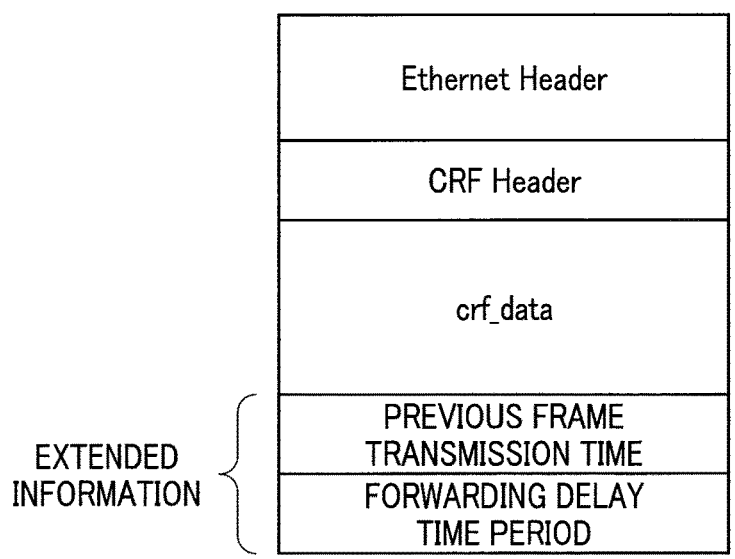
FIG. 2 shows a structure of an extended CRF frame, according to the first embodiment.

FIG. 2 shows a structure of the extended CRF frame. The extended CRF frame includes an Ethernet header field, a CRF header field, a crf_data field, and an extended information field. The extended information field includes a previous frame transmission time field and a forwarding delay time period field.

The crf_data field contains a plurality of gPTP data acquired at a plurality of predetermined timing times in the node A. The plurality of timing times are, for example, a plurality of timestamp data acquired at a predetermined time interval. More specifically, when a rising or falling timing of the media clock is assumed to be a media clock event, timestamp data (gPTP data) on a predetermined number of (for example, six) the media clock events acquired at a predetermined interval (for example, a 300-Hz timing interval) is contained in the crf_data field. In other words, a predetermined number of timestamps based on the gPTP clock as a wall clock of the network system 1 are stored in the crf_data field.

As will be describe later, at a slave, error in the media clock of the slave is corrected based on the plurality of gPTP data transmitted from the master. Since a media clock frequency varies due to a temperature environment and the like at each of the master and the slave, the slave makes a correction to cause the media clock frequency in the slave to coincide with the media clock frequency in the master.

As described above, in the present embodiment, the timestamps of the media clock events in the node A are periodically delivered within the network by using the crf_data field in the extended CRF frame.

A CRF frame is, here, a frame defined by IEEE 1722, Clause 10, and the extended CRF frame is a frame compliant with the CRF frame. In general, when the media clock synchronization using such CRF is performed, it is a precondition that the respective gPTP clocks referred to by the nodes A, B, and C are in synchronization with each other. The gPTP clock synchronization requires a procedure using a gPTP protocol defined by IEEE 802.1AS. In the present embodiment, however, each of the nodes B and C synchronizes the own internal gPTP clock with the gPTP clock (master) included within the node A by using extended information contained in the extended CRF frame shown in FIG. 2, without using the gPTP protocol.

To achieve such synchronization, the extended information is added to the extended CRF frame. The extended information includes a previous frame transmission time and a forwarding delay time period. When the node A transmits the CRF frame, the previous frame transmission time is a transmission time of a previous CRF frame transmitted immediately previous to the CRF frame. The forwarding delay time period is the amount of a delay related to a forwarding time period occurring after the switch SW receives the CRF frame and before the switch SW transmits the CRF frame, that is, the time period of a forwarding delay.

Note that although the previous frame transmission time is a transmission time of the CRF frame transmitted immediately previous to a frame to be transmitted, that is, the CRF frame transmitted one frame earlier in the present embodiment, the transmission time of the CRF frame transmitted the plurality of frames earlier, such as two or three frames earlier, may be used.

[2] Configurations of Node and Switch

Figure 3:
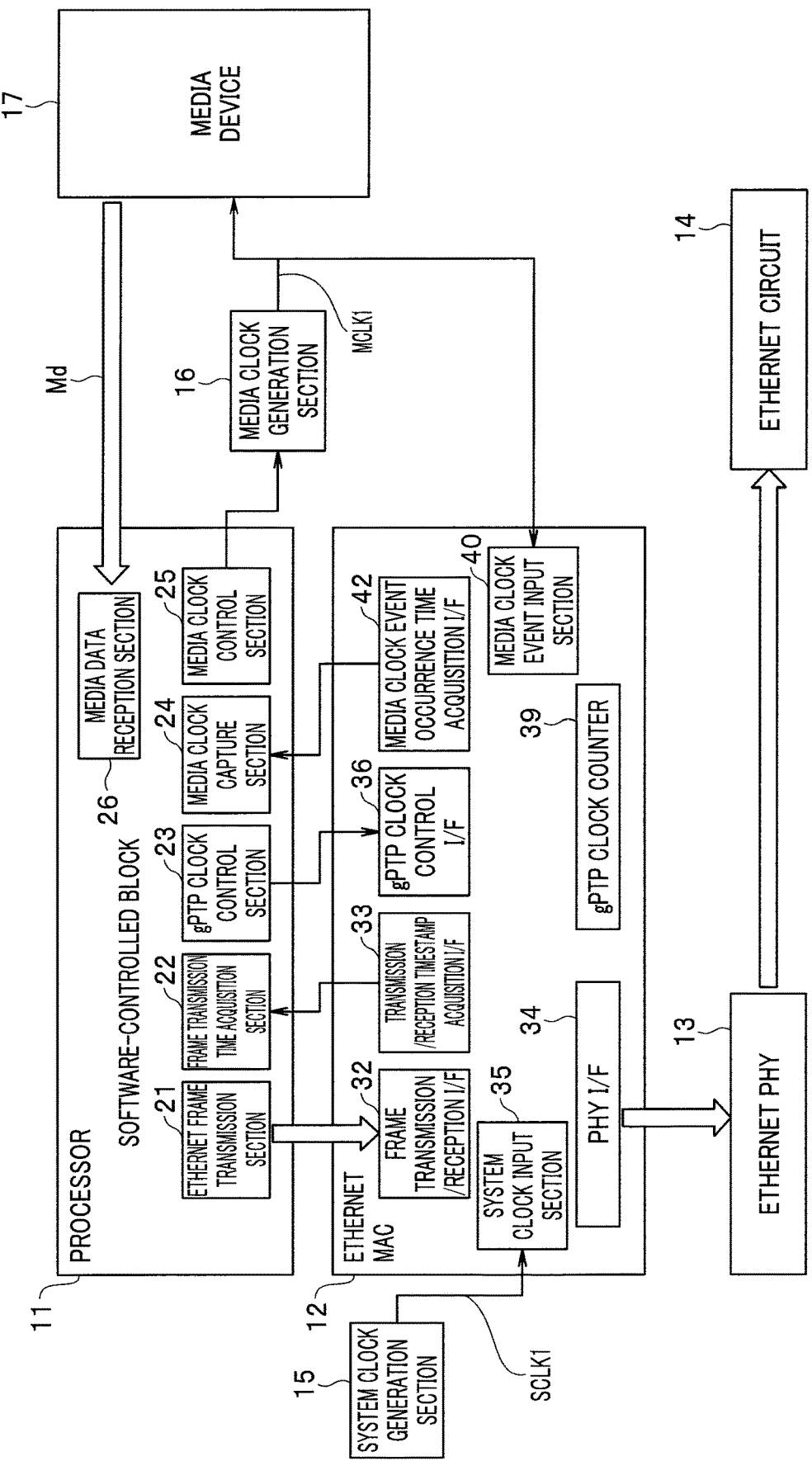
FIG. 3 is a block diagram showing a configuration of a transmission apparatus according to the first embodiment.
Figure 4:
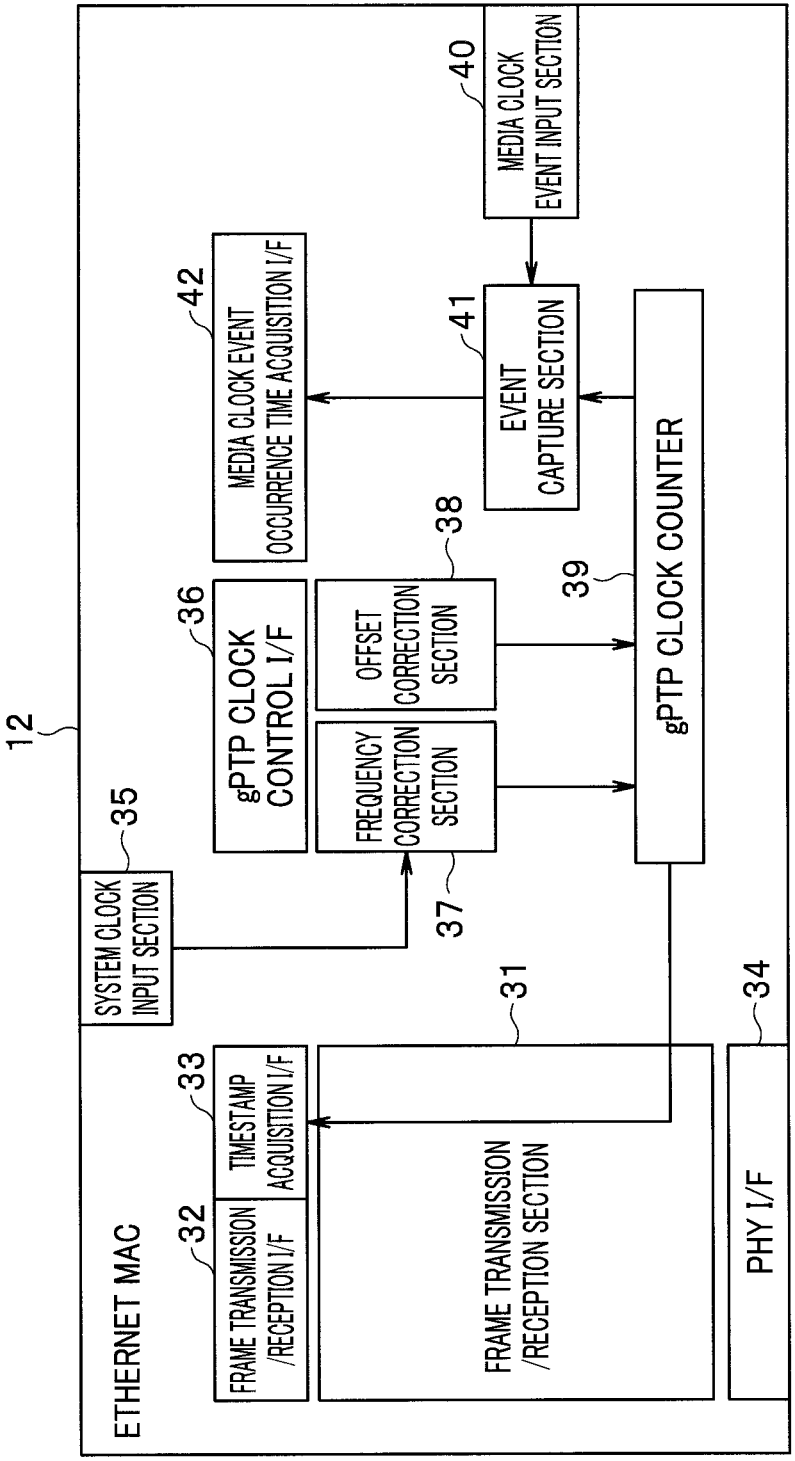
FIG. 4 is a block diagram showing a configuration of an Ethernet (registered trademark; the same applies hereinafter) MAC in the transmission apparatus, according to the first embodiment.

Next, configurations of the each node and the switch will be described in detail. FIG. 3 is a block diagram showing a configuration of the node A. FIG. 4 is a block diagram showing a configuration of the Ethernet MAC in the node A.

Note that a configuration of the Ethernet MAC in the node B is the same as the configuration of the Ethernet MAC in the node A shown in FIG. 4. A reason is to allow any node to serve as any of the master and the slave. In the present embodiment, as described above, the node A is the master, and the other nodes than the node A are the slaves.

As shown in FIG. 3, the node A includes a processor 11, the Ethernet MAC 12, an Ethernet PHY (physical layer) 13, an Ethernet line 14, a system clock generation section 15, a media clock generation section 16, and a media device 17.

The processor 11 includes a CPU (central processing unit), a ROM, a RAM, various interfaces, and the like. The CPU implements various functions by reading a control program stored in the ROM, and deploying and executing the control program in the RAM. The control program implements functions, as a software-controlled block, of an Ethernet frame transmission section 21, a frame transmission time acquisition section 22, a gPTP clock control section 23, a media clock capture section 24, a media clock control section 25, and a media data reception section 26.

Note that the processor 11 may be implemented by using an electronic circuit such as an FPGA (field programmable gate array).

The Ethernet MAC 12 is located between an Ethernet data link layer and the Ethernet PHY 13 and includes a MAC (media access control) frame transmission/reception circuit. As shown in FIG. 4, the Ethernet MAC 12 includes a frame transmission/reception section 31, a frame transmission/reception interface (hereinafter, abbreviated as frame transmission/reception I/F) 32, a timestamp acquisition interface (hereinafter, abbreviated as timestamp acquisition I/F) 33, a PHY (physical layer) interface (hereinafter, abbreviated as PHY I/F) 34, a system clock input section 35, a gPTP clock control interface (hereinafter, abbreviated as gPTP clock control I/F) 36, a frequency correction section 37, an offset correction section 38, a gPTP clock counter 39, a media clock event input section 40, an event capture section 41, and a media clock event occurrence time acquisition interface (hereinafter, abbreviated as media clock event occurrence time acquisition I/F) 42.

The frame transmission/reception section 31 is connected to the frame transmission/reception I/F 32, which is an upper layer, and to the PHY I/F 34, which is a lower layer, and is configured to control transmission and reception of the Ethernet frame.

The frame transmission/reception I/F 32 is configured to pass frame data received from or transmitted to the processor 11. Note that in the node B, the frame transmission/reception I/F 32 is configured to pass frame data received from or transmitted to a processor 71.

The timestamp acquisition I/F 33 is a register for storing a time (gPTP clock counter value) at a time point when the frame transmission/reception section 31 transmits the Ethernet frame. The processor 11 can acquire a transmission time of the Ethernet frame from the timestamp acquisition I/F 33. Note that in the node B, the timestamp acquisition I/F 33 is a register for storing a time (gPTP clock counter value) at a time point when the processor 71 receives the Ethernet frame. The processor 71 can acquire a reception time of the Ethernet frame from the timestamp acquisition I/F 33. For example, the timestamp acquisition I/F 33 acquires a time (gPTP clock counter value) at a timing of transmitting to the PHY I/F 34, or receiving, data immediately following a preamble part of a MAC frame.

The PHY I/F 34 is connected to the Ethernet PHY 13 or 73, which is an Ethernet physical layer device.

The system clock input section 35 is a circuit to which an operation clock for the Ethernet MAC 12 is inputted.

The gPTP clock control I/F 36 is an interface for allowing the processor 11 or 71 to control operation setting of the gPTP clock counter 39, activation of the gPTP clock counter 39, and frequency correction and offset correction to the gPTP clock counter 39 during activation.

The frequency correction section 37 is configured to perform the frequency correction to the gPTP clock counter 39. The frequency correction section 37 includes a variable divider and is configured to supply to the gPTP clock counter 39, for example, an adjustment value for a slope of an integrated count value in order to adjust a clock cycle such that the frequency becomes a desired frequency. In the present embodiment, the frequency correction section 37 operates only at the slave nodes B and C, and does not operate at the master node A.

The offset correction section 38 is configured to perform offset correction to the gPTP clock counter 39. The offset correction section 38 is configured to supply to the gPTP clock counter 39 an offset value to correct a current time of the gPTP clock. The gPTP clock counter 39 is configured to correct a counter value by using the offset value received. In the present embodiment, the offset correction section 38 operates only at the slave nodes B and C, and does not operate at the master node A.

The gPTP clock counter 39 is a counter configured to keep the current time. In other words, the gPTP clock counter 39 is included as a current time keeping circuit configured to keep the current time in the node A. A counting cycle of the gPTP clock can be adjusted based on a clock adjustment value from the frequency correction section 37.

The media clock event input section 40 is configured to receive input of the media clock from the media clock generation section 16, for example, a clock signal MCLK 1 with an audio sampling frequency (for example, 48 KHz).

The event capture section 41 is configured to detect a rising or falling edge of each pulse of the media clock signal MCLK 1 inputted to the media clock event input section 40, and to store a time (a counter value of the gPTP clock counter 39) at a time point of the detection.

Note that the event capture section 41 may be configured to eliminate a predetermined number of pulses of the media clock signal MCLK 1 at a predetermined cycle and to detect the edge of every predetermined number-th pulse of the media clock signal MCLK 1.

The media clock event occurrence time acquisition I/F 42 is an interface for allowing the processor 11 or 71 to acquire an occurrence time of the media clock event stored in the event capture section 41.

Referring back to FIG. 3, the Ethernet frame transmission section 21, among the functions of the processor 11, is configured to create a transmission Ethernet frame and to transmit the transmission Ethernet frame out to Ethernet line 14 via the frame transmission/reception I/F 32 and the Ethernet PHY 13. The Ethernet frame transmission section 21 is a frame transmission section configured to create the Ethernet frame to be transmitted and to transmit the extended CRF frame as described above.

The frame transmission time acquisition section 22 is configured to acquire, via the timestamp acquisition I/F 33, the transmission time of the Ethernet frame transmitted by the Ethernet frame transmission section 21. The acquired time information is transmitted by the Ethernet frame transmission section 21, which will be described later.

The gPTP clock control section 23 is configured to perform initial setting and activation of the gPTP clock counter 39 via the gPTP clock control I/F 36.

The media clock capture section 24 is configured to acquire an occurrence time of the event of the media clock signal MCLK 1 via the media clock event occurrence time acquisition I/F 42. From among the plurality of such time information pieces consecutively acquired, the media clock capture section 24 is configured to acquire the plurality of time information pieces at a predetermined time interval. The acquired time information pieces on a plurality of (here, six) timing times are stored in the crf_data field of the extended CRF frame and transmitted by the Ethernet frame transmission section 21.

The media clock control section 25 is configured to perform initial setting of the media clock generation section 16 and to cause the media clock generation section 16 to start outputting the media clock signal MCLK 1.

The media data reception section 26 is configured to receive media data Md from the media device 17 and to supply the media data Md to the Ethernet frame transmission section 21.

The Ethernet PHY 13 is connected to the PHY I/F 34 and is configured to transmit and receive the Ethernet frame over the Ethernet line 14.

The system clock generation section 15 is configured to generate an operation clock for the Ethernet MAC 12. The generated system clock is supplied to the Ethernet MAC 12 and serves as source oscillation for the gPTP clock counter 39.

The media clock generation section 16 is configured to output, for example, the 48-KHz media clock signal as an audio sampling clock. The media clock signal is supplied to the media device 17 and also to the media clock event input section 40. In other words, the media clock generation section 16 is a clock generation circuit configured to generate a clock signal for reproduction of at least one data of the audio data and the video data.

The media device 17 is an audio input device such as a microphone. A signal from the microphone or the like is converted from an analog signal into a digital signal through sampling in synchronization with the media clock signal MCLK 1 from the media clock generation section 16, and supplied as the media data Md to the media data reception section 26.

The Ethernet line 14 is connected to the switch SW. The switch SW is provided on the network and forwards the Ethernet frame such as the extended CRF frame.

Figure 5:
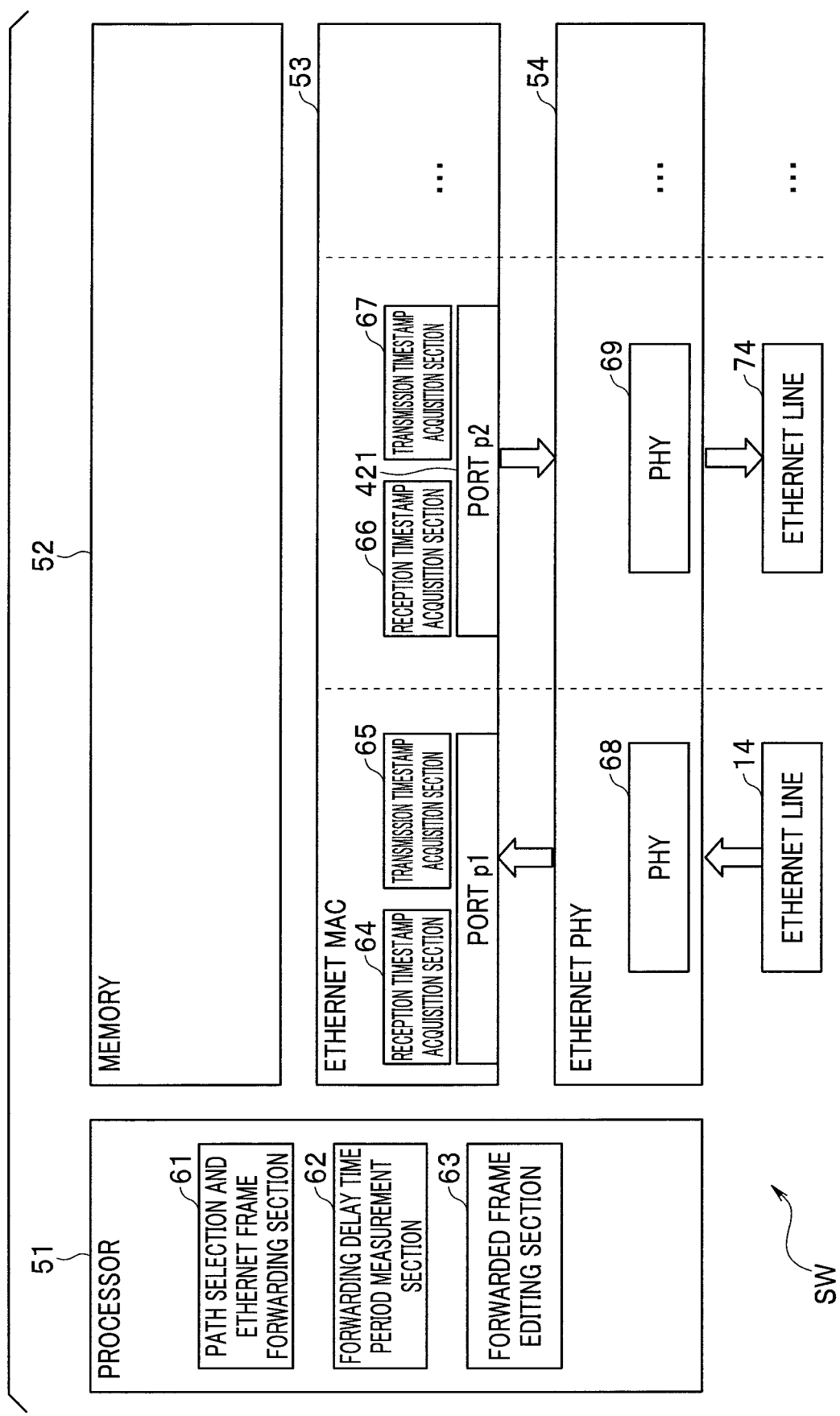
FIG. 5 is a block diagram showing a configuration of a switch, according to the first embodiment.

Next, a configuration of the switch SW will be described. FIG. 5 is a block diagram showing the configuration of the switch SW. The switch SW includes a processor 51, a memory 52, an Ethernet MAC 53, and an Ethernet PHY 54.

The processor 51 includes a CPU (central processing unit), a ROM, a RAM, various interfaces, and the like. The CPU implements various functions by reading a control program stored in the ROM, and deploying and executing the control program in the RAM. The control program includes functions of a path selection and Ethernet frame forwarding section 61, a forwarding delay time period measurement section 62, and a forwarded frame editing section 63.

The path selection and Ethernet frame forwarding section 61 relates to basic functions included in an Ethernet switch. The path selection and Ethernet frame forwarding section 61 is configured to output a signal inputted from the each Ethernet line to a predetermined Ethernet line.

The forwarding delay time period measurement section 62 relates to a function of measuring, for each delivery-destination port, a forwarding delay time period occurring before the Ethernet frame received at one port is transmitted from each of one or more ports that are forwarding destinations, and storing the forwarding delay time periods in the memory 52. For example, when the Ethernet frame received at a port p1 in FIG. 5 is transmitted from a port p2, the forwarding delay time period measurement section 62 is configured to acquire a reception time at which the frame is received, from a reception timestamp acquisition section 64 (which will be described later) of the port p1. The forwarding delay time period measurement section 62 is configured to acquire a transmission time at which the received frame is transmitted from the port p2, from a transmission timestamp acquisition section 67 (which will be described later) of the port p2, and measure a forwarding delay time period in forwarding from the port p1 to the port p2 by calculating a difference between the reception time and the transmission time. The measured forwarding delay time period is stored in the memory 52 in association with the transmission port as appropriate. The forwarding delay time period measurement section 62 is configured to calculate a time period S[n−1] and the like, which will be describe later.

When the path selection and Ethernet frame forwarding section 61 operates, the forwarded frame editing section 63 is configured to edit the Ethernet frame having a preset format by using the forwarding delay time period stored in the memory 52. The forwarded frame editing section 63 updates the forwarding delay time period contained in the above-described extended information. Accordingly, the forwarded frame editing section 63 is included as a frame editing section configured to update a forwarding delay time period contained in the forwarding delay time period field by using the measured forwarding delay time period.

The memory 52 is configured to store various information when the path selection and Ethernet frame forwarding section 61, the forwarding delay time period measurement section 62, and the forwarded frame editing section 63 are executed.

The Ethernet MAC 53 includes a plurality of input/output ports, here, three ports p1, p2, and p3. The ports p1, p2, and p3 correspond to the above-described ports P1, P2, and P3, respectively. FIG. 5 shows that the reception timestamp acquisition section 64 and a transmission timestamp acquisition section 65 are provided to support the port p1, and a reception timestamp acquisition section 66 and the transmission timestamp acquisition section 67 are provided to support the port p2.

The Ethernet PHY 54 includes a plurality of PHY layers, and FIG. 5 shows two PHY layers 68 and 69.

The port p1 is an interface for transmitting and receiving a frame over the Ethernet line 14 via the PHY layer 68 and, in FIG. 5, receives the Ethernet frame.

The port p2 is an interface for transmitting and receiving a frame over an Ethernet line 74 via the PHY layer 69 and, in FIG. 5, transmits the Ethernet frame.

Each of the reception timestamp acquisition sections 64 and 66 is configured to acquire the reception time of the Ethernet frame received at the corresponding port.

Each of the transmission timestamp acquisition sections 65 and 67 is configured to acquire the transmission time of the Ethernet frame transmitted from the corresponding port.

Figure 6:
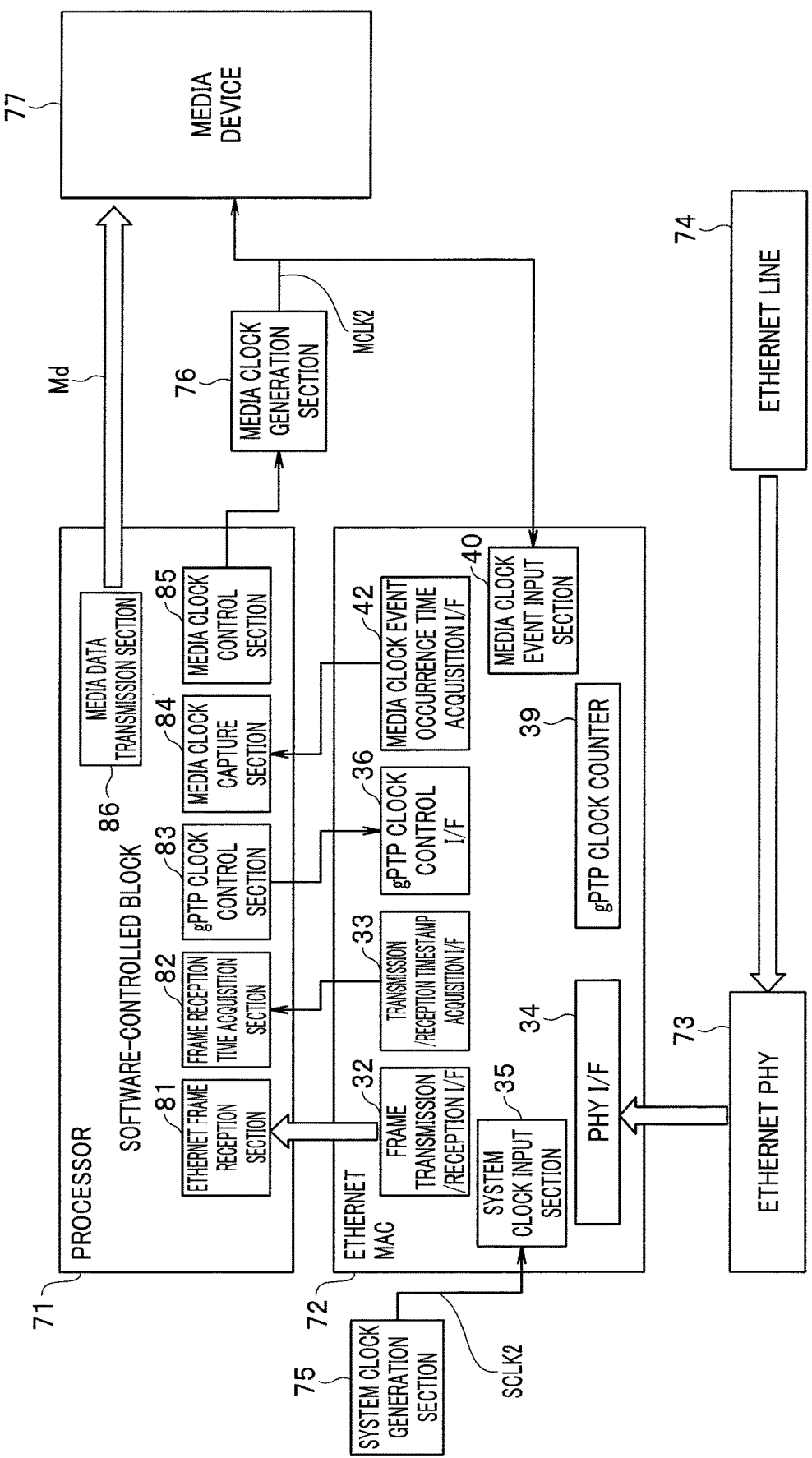
FIG. 6 is a block diagram showing a configuration of a reception apparatus according to the first embodiment.

Next, a configuration of the node B will be described. Note that since a configuration of the node C is the same as the configuration of the node B, a description of like components and like functions is omitted. FIG. 6 is a block diagram showing the configuration of the node B.

Since the configuration of the node B is approximately similar to the configuration of the node A shown in FIG. 3, the same components are denoted in FIG. 6 by the same names as in FIG. 3. A description of the same components and the same functions is omitted, and different components and different functions will be described.

As shown in FIG. 6, the node B includes the processor 71, an Ethernet MAC 72, the Ethernet PHY (physical layer) 73, the Ethernet line 74, a system clock generation section 75, a media clock generation section 76, and a media device 77.

The processor 71 includes a CPU (central processing unit), a ROM, a RAM, various interfaces, and the like. The CPU implements various functions by reading a control program stored in the ROM, and deploying and executing the control program in the RAM. The control program implements functions of an Ethernet frame reception section 81, a frame reception time acquisition section 82, a gPTP clock control section 83, a media clock capture section 84, a media clock control section 85, and a media data transmission section 86.

Note that the processor 71 may be implemented by using an electronic circuit such as an FPGA (field programmable gate array).

The Ethernet MAC 72 is located between an Ethernet data link layer and the Ethernet PHY 73 and includes a MAC frame transmission/reception circuit. Although a depiction of a configuration of the Ethernet MAC 72 is omitted because the Ethernet MAC 72 has the same configuration as the configuration of the Ethernet MAC 12 in the node A shown in FIG. 4, FIG. 6 shows the frame transmission/reception I/F 32, the timestamp acquisition I/F 33, the PHY I/F 34, the system clock input section 35, the gPTP clock control I/F 36, the gPTP clock counter 39, the media clock event input section 40, and the media clock event occurrence time acquisition I/F 42, which are shown in FIG. 4.

The gPTP clock counter 39 of the Ethernet MAC 72 in the node B is included as a current time keeping circuit configured to keep the current time in the node B.

The Ethernet frame reception section 81 is configured to receive, via the frame transmission/reception I/F 32, Ethernet frame data arriving at the Ethernet PHY 73 from the Ethernet line 74. The Ethernet frame reception section 81 is a frame reception section configured to receive the extended CRF frame included in the Ethernet frame through the network. Time information T[n−1] (which will be described later) contained in the received extended CRF frame is supplied to the gPTP clock control section 83, and a plurality of time information pieces (which will be described later) contained in the crf_data field and acquired at a predetermined interval, which will be described later, are supplied to the media clock control section 85.

The frame reception time acquisition section 82 is configured to acquire the reception time of the Ethernet frame received via the frame transmission/reception I/F 32 and to supply the acquired time information to the gPTP clock control section 83. The reception time is time information R[n−1] or the like, which will be described later. The reception time is supplied to the gPTP clock control section 83.

The gPTP clock control section 83 is configured to perform the initial setting of the gPTP clock counter 39, the activation of the gPTP clock counter 39, and the offset correction and the frequency correction to the gPTP clock counter 39 during activation, via the gPTP clock control I/F 36. As will be described later, the gPTP clock control section 83 is configured to generate offset data for time correction based on a transmission time (T[n−1] or the like, which will be described later) contained in the received Ethernet frame (here, the extended CRF frame) and a reception time (R[n−1] or the like, which will be described later) of the Ethernet frame, and to supply the offset data to the offset correction section 38. The gPTP clock control section 83 is configured to calculate a slope (the amount of an increase per unit time period) of an integrated count value as an adjustment coefficient, which will be described later, and to supply the calculated slope data to the frequency correction section 37 via the gPTP clock control I/F 36 of the Ethernet MAC 72.

The media clock capture section 84 is configured to acquire an occurrence time of an event of a media clock signal MCLK 2 via the media clock event occurrence time acquisition I/F 42. From among the plurality of such time information pieces consecutively acquired, the media clock capture section 84 acquires a plurality of time information pieces at a predetermined time interval. The predetermined time interval used by the media clock capture section 84 is equal to the predetermined time interval used by the media clock capture section 24. The acquired time information pieces on a plurality of (here, six) timing times are supplied to the media clock control section 85.

The media clock control section 85 is configured to perform initial setting of the media clock generation section 76 and to cause the media clock generation section 76 to output the media clock signal MCLK 2. The media clock control section 85 is configured to perform the frequency correction to the media clock during activation.

Here, the media clock control section 85 is configured to compare a plurality of time information pieces contained in a received extended CRF frame with the plurality of time information pieces supplied from the media clock capture section 84, and to supply to the media clock generation section 76 setting data to cause the plurality of timings of the plurality of time information pieces supplied from the media clock capture section 84 to coincide with the plurality of timings of the plurality of time information pieces received from the node A.

The media data transmission section 86 is configured to transmit the media data received by the Ethernet frame reception section 81 to the media device 77.

The Ethernet PHY 73 is connected to the PHY I/F 34 and is configured to transmit and receive the Ethernet frame over the Ethernet line 74.

The system clock generation section 75 is configured to generate an operation clock for the Ethernet MAC 72. The generated system clock is supplied to the Ethernet MAC 72 and serves as a source oscillation for the gPTP clock counter 39.

The media clock generation section 76 is configured to output, for example, the 48-KHz media clock signal as an audio sampling clock. The media clock signal is supplied to the media device 77 and also inputted to the media clock event input section 40. In other words, the media clock generation section 76 is a clock generation circuit configured to generate a clock signal for reproduction of at least one data of the audio data and the video data.

The media clock generation section 76 is configured to perform the frequency correction to the media clock signal MCLK 2 in accordance with an instruction from the media clock control section 85. The media clock generation section 76 includes a variable PLL circuit and is configured to generate the clock signal with a frequency according to the setting data from the media clock control section 85 and to output the media clock signal MCLK 2.

The media device 77 is an audio output device such as a speaker amplifier. The media device 77 receives the media data Md transmitted by the media data transmission section 86 and outputs the audio data synchronized with the media clock signal MCLK 2.

The Ethernet line 74 is connected to the switch SW.

(Operation)

In general, in order to transmit and receive the CRF frame, it is necessary that the gPTP clock recognized by the each node be synchronized with each other through execution of the gPTP protocol. In other words, prior to use of the CRF frame, the gPTP clock synchronization through the gPTP protocol defined by IEEE 802.1AS is performed in order to achieve synchronization among the gPTP clocks of the individual nodes in the network.

Figure 7:
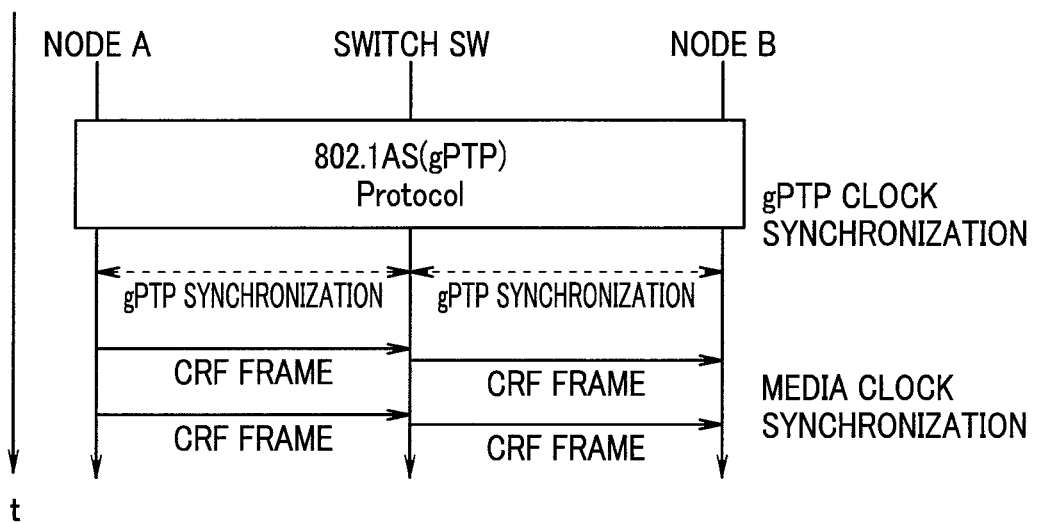
FIG. 7 is a diagram for describing a media clock synchronization procedure using an ordinary CRF frame, according to the first embodiment.

FIG. 7 is a diagram for describing a media clock synchronization procedure using the ordinary CRF frame. FIG. 7 shows that passage of a time period t goes from the top to the bottom of the figure. When the network system 1 is activated, for example, gPTP clock synchronization processing according to the gPTP protocol defined by IEEE 802.1AS is performed between the nodes. When the gPTP clock synchronization processing is completed, the respective gPTP clocks of the nodes are in synchronization with each other. The gPTP clock synchronization processing is periodically performed. After the gPTP clock synchronization processing, media clock synchronization using the CRF frame is performed, and the respective media clocks of the nodes fall in synchronization with each other. The media clock synchronization using the CRF frame is also periodically performed.

However, in the in-vehicle network system such as the AVB (audio/video bridging) network, the media clock synchronization is required in a situation where the gPTP protocol does not run in some cases, such as when the gPTP protocol is not implemented, or when it is desired to start media reproduction immediately after the network is activated. According to the present embodiment, the gPTP clock synchronization and the media clock synchronization between the nodes are possible under such a situation where the gPTP protocol does not run.

Figure 8:
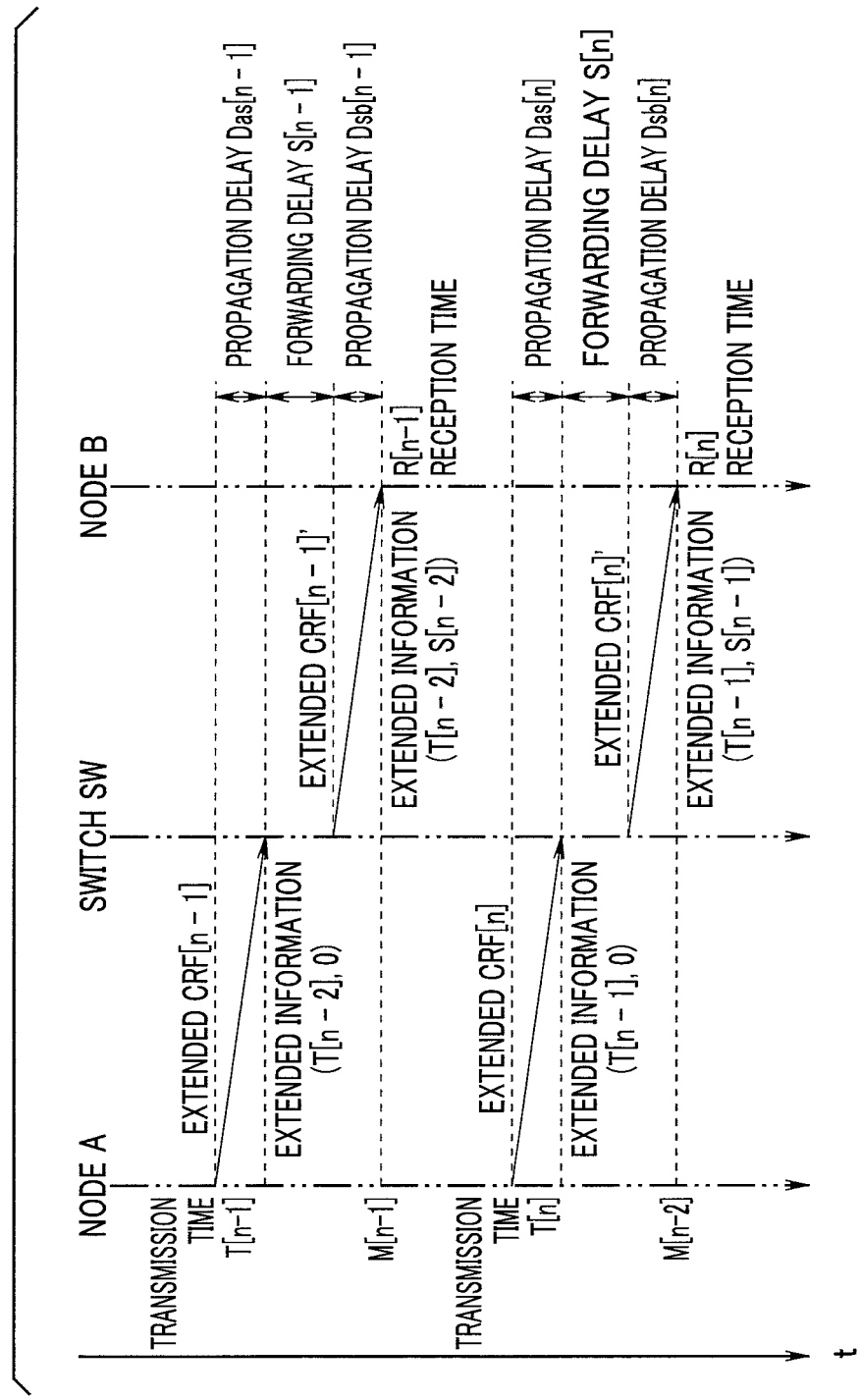
FIG. 8 is a diagram showing how the extended CRF frame delivered from the transmission apparatus is propagated to the reception apparatus in the network system 1, according to the first embodiment.

FIG. 8 is a diagram showing how the extended CRF frame delivered from the node A is propagated to the node B in the network system 1 shown in FIG. 1. In FIG. 8, passage of the time period t goes from the top to the bottom of the figure. T[n] and T[n−1] represent times of timestamps (based on the gPTP clock in the node A) for a frame transmission time of the extended CRF frame CRF[n] at the node A. R[n] and R[n−1] represent times of timestamps (based on the gPTP clock in the node B) for a frame reception time of the extended CRF frame CRF[n] at the node B.

When the node A transmits the extended CRF frame at the transmission time T[n], the node A stores T[n−1] as time information in the previous frame transmission time field in the extended information part of the extended CRF frame, and transmits the extended CRF frame CRF[n] in which "0" is stored in the forwarding delay time period field. Note that the previous frame transmission time is not contained in the extended information of the extended CRF frame transmitted for a first time from the node A.

In other words, the Ethernet frame transmission section 21 of the node A is a frame transmission section configured to transmit the extended CRF frame as a predetermined frame at a first timing (T[n]), and to transmit, to the node B through the network at the first timing (T[n]), the extended CRF frame containing a transmission time (T[n−1]) that is based on the current time in the node A and at which a previous extended CRF frame is transmitted at a second timing (T[n−1]) that is previous to the first timing (T[n]).

In the event, the predetermined number of timestamps are stored in the crf_data field of the extended CRF frame. For example, data on the six timestamps is stored in the crf_data field. The six timestamps include time data acquired by the media clock capture section 24 of the node A at a predetermined interval (for example, a 300-Hz timing interval) based on the media clock signal MCLK 1 in the node A.

At the switch SW, when the extended CRF frame CRF[n] is received, the switch SW stores a value obtained after addition of S[n−1] in the forwarding delay time period field and transmits the extended CRF frame CRF[n]' including the resultant forwarding delay time period field to the node B. Here, S[n−1] is a forwarding delay time period required when the previous extended CRF frame is forwarded, that is, a time period after the extended CRF frame CRF[n−1] is received from the node A and before the extended CRF frame CRF[n−1]' is transmitted to the node B. S[n−1] is a time period measured by the forwarding delay time period measurement section 62. The forwarded frame editing section 63 adds S[n−1] to the forwarding delay time period field.

Note that in a network configuration including the multiple-stage switches SW, at the each switch SW, a forwarding delay time period occurring at the switch SW is added to a sum of forwarding delay time periods occurring up to the previous-stage switches SW. The extended CRF frame CRF[n−1]' is transmitted to the node B by the path selection and Ethernet frame forwarding section 61.

At the node B, when the extended CRF frame CRF[n]' is received, the node B acquires and stores a time R[n] of a reception timestamp that is based on an own local gPTP time, and calculates a gPTP time M[n−1] in the node A at a time point of a time R[n−1] that is a reception time of the extended CRF frame CRF[n−1]' previously received, based on a following equation (1).

$$M[n-1]=T[n-1]+Das[n-1]+S[n-1]+Dsb[n-1] \quad (1)$$

Here, for T[n−1] and S[n−1], the values stored in the extended information field of the received extended CRF frame CRF[n]' are used.

Moreover, Das[n−1] represents a physical layer propagation delay of the Ethernet frame from the node A to the switch SW, and Dsb[n−1] represents a physical layer propagation delay of the Ethernet frame from the switch SW to the node B. Such a physical layer propagation delay between the adjacent nodes can be regarded as constant or having a linear relation to a packet length. Accordingly, in a fixed network configuration such as the in-vehicle network, a total sum of the physical layer propagation delays over a propagation path can be calculated based on the received packet length at the node that receives the extended CRF frame, by presetting a linear coefficient for the each propagation path of the extended CRF frame.

Assuming that a total sum of the physical layer propagation delays over a path from the node A to the node B (Das[n−1]+Dsb[n−1]) is D[n−1], the equation (1) can be rewritten as a following equation (2).

$$M[n-1]=T[n-1]+S[n-1]+D[n-1] \quad (2)$$

As described above, a whole delay time period of the extended CRF frame from the node A to the node B includes the forwarding delay time period (S[n−1]) occurring at the switch SW after the extended CRF frame from the node A is received and before the extended CRF frame is transmitted to the node B, and the total-sum time period of the physical layer propagation delays.

A time difference TimeDiff[n−1] between the node A and the node B at the time point of the time R[n−1] is expressed by a following equation (3).

$$\text{TimeDiff}[n-1]=M[n-1]-R[n-1] \quad (3)$$

The node B can synchronize the own gPTP clock (time and frequency) with the gPTP clock of the node A by using values obtained from the equations (2) and (3).

The gPTP clock control section 83 of the node B corrects a count value of the gPTP clock counter 39 by supplying the difference TimeDiff[n−1] obtained from the equation (3) as an offset value to the offset correction section 38.

As described above, the gPTP clock control section 83 is included as a clock synchronization section configured to synchronize the current time in the node B with the current time in the node A, based on the transmission time T[n−1] contained in the extended CRF frame, the reception time (R[n−1]) that is based on the current time in the node B and at which the previous extended CRF frame transmitted at the time T[n−1] of a transmission timing of the previous extended CRF frame is received, and the delay time period (D[n−1] D[n−1]+S[n−1])) that is contained in the extended CRF frame and occurs while the previous extended CRF frame is transmitted from the node A to the node B through the network.

The gPTP clock control section 83 synchronizes the current time in the node B with the current time in the node A by using the difference TimeDiff between the time M[n−1], which is obtained by adding the delay time period D[n−1] (=D[n−1]+S[n−1]) to the transmission time T[n−1], and the reception time R[n−1].

Note that when not the transmission time of the CRF frame transmitted immediately previous to a frame to be transmitted, that is, the CRF frame transmitted one frame earlier, but the transmission time of the CRF frame transmitted a plurality of frames earlier, such as two or three frames earlier, is used for the previous frame transmission time, the time information stored in the previous frame transmission time field is T[n−2], T[n−3], or the like; time period information stored in the forwarding delay time period field is S[n−2], S[n−3], or the like; the gPTP time in the node A is M[n−2], M[n−3], or the like; and the reception time is R[n−2], R[n −3], or the like, for each of the above equations.

As a method for constantly maintaining the gPTP clock synchronization, a frequency adjustment coefficient α is calculated at a time point of receiving the extended CRF frame CRF[n]' based on a following equation (4) and fed back to the gPTP clock generation circuit of the node B.

$$\alpha[n-1]=((M[n-1]-M[n-N])+\text{TimeDiff}[n-1])/(R[n-1]-R[n-N]) \quad (4)$$

In the equation (4), N relates to a rate of occurrence of frequency adjustment and means that the frequency adjustment is performed when every N-th extended CRF frame is received.

Here, the gPTP clock control section 83 calculates a clock adjustment value for changing a counting cycle of the gPTP clock, based on the frequency adjustment coefficient α. The gPTP clock control section 83 corrects gPTP clock frequency via the frequency correction section 37 by using the clock adjustment value.

As described above, the gPTP clock control section 83 is included as a clock synchronization section configured to synchronize the clock frequency of the gPTP clock counter 39 that keeps the current time in the node B with the clock frequency of the gPTP clock counter 39 that keeps the current time in the node A, by using the plurality of transmission times contained in extended CRF frames received on a plurality of numbers of occasions, a plurality of reception times when the plurality of extended CRF frames are received, and the difference TimeDiff.

The plurality of time information pieces on the node A contained in the crf_data are compared with the plurality of time information pieces on the node B obtained by the media clock capture section 84, and the setting data for causing each time interval among the plurality of time information pieces on the node B to coincide with each time interval among the plurality of time information pieces on the node A is supplied from the media clock control section 85 to the media clock generation section 76. As a result, the media clock signal MCLK 2 in the node B is synchronized with the media clock signal MCLK 1 in the node A.

In other words, the extended CRF frame contains the plurality of timing times acquired at the predetermined first time interval based on the media clock signal MCLK 1 in the node A. The media clock control section 85 is included as a clock synchronization section (85) configured to synchronize the media clock signal MCLK 2 with the media clock signal MCLK 1 such that clock timings of the media clock signal MCLK 2 coincide with clock timings of the media clock signal MCLK 1, based on the plurality of (here, six) timing times contained in the extended CRF frame, and a plurality of (here, six) timing times acquired at a second time interval that is based on the media clock signal MCLK 2 in the node B and is equal to the first time interval.

According to a gPTP clock synchronization method as described above, the gPTP clock synchronization and the media clock synchronization can be started by delivering at least the three extended CRF frames after the network system 1 is activated.

Figure 9:
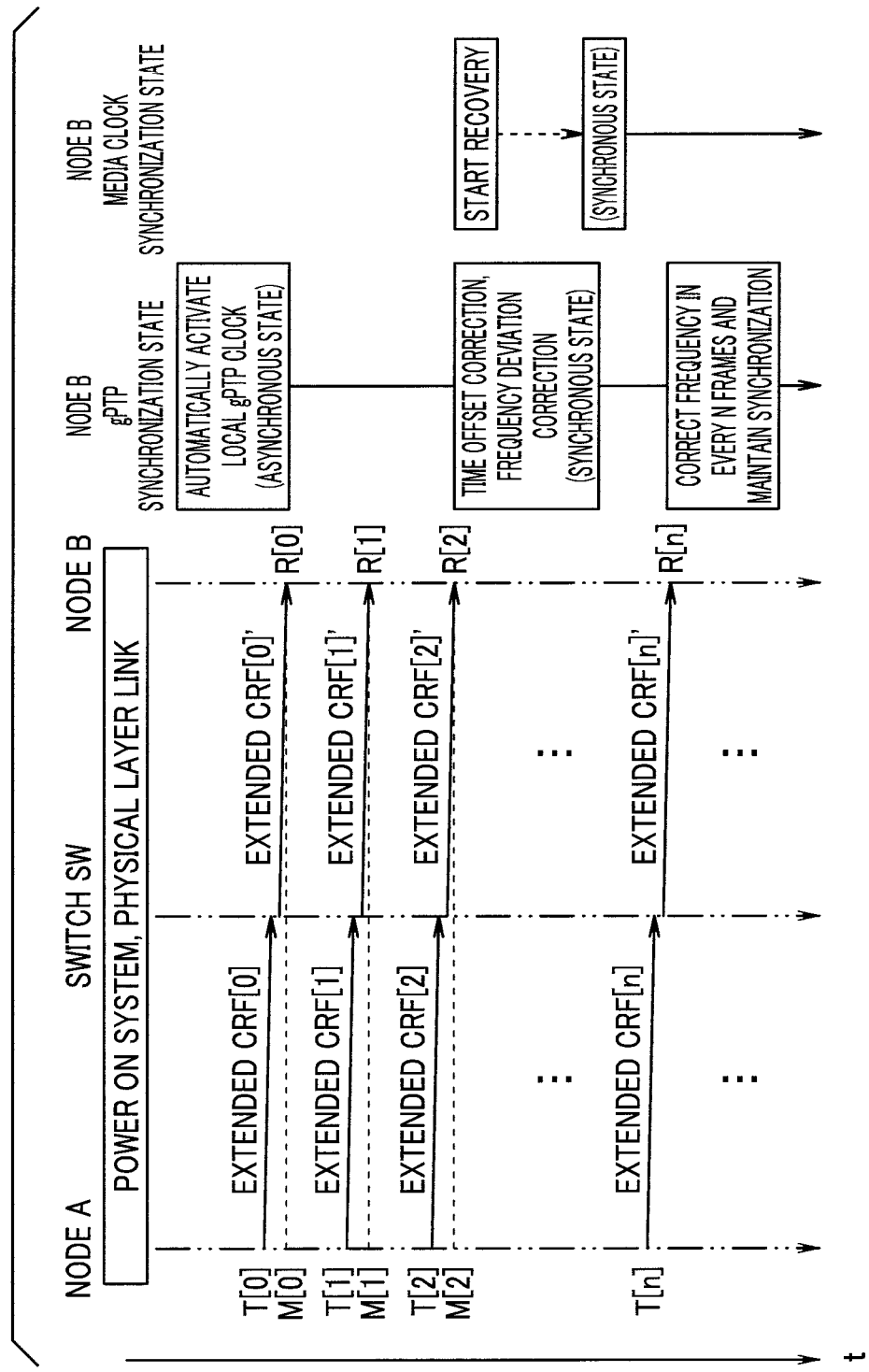
FIG. 9 is a diagram showing how the three extended CRF frames delivered from the transmission apparatus are propagated to the reception apparatus, according to first embodiment.

FIG. 9 is a diagram showing how the three extended CRF frames delivered from the node A are propagated to the node B in the network system 1 shown in FIG. 1.

In FIG. 9, the node A periodically delivers the extended CRF frame after the network system 1 is activated. A delivery cycle is generally 20 msec (50 Hz) in a case of an audio CRF frame.

The node B can calculate values for M[0] and M[1] after the extended CRF frame CRF[2]' is received, based on the equation (2). By using the values, a gPTP clock frequency ratio FR between the nodes A and B is calculated based on a following equation (5).

$$FR=(M[1]-M[0])/(R[1]-R[0]) \quad (5)$$

An estimated value IV[M2] for M[2] at a time point of a time R[2] is calculated based on a following equation (6).

$$IV[M2]=M[1]+(R[2]-R[1])\times FR \quad (6)$$

The node B performs the frequency correction by using the value calculated based on the equation (5) and the time offset correction by using the value calculated based on the equation (6) to the own gPTP clock at the same time. Thus, gPTP clock initial synchronization is established between the nodes A and B. Thereafter, the node B maintains the gPTP clock synchronization by calculating the equation (4) when, for example, every N-th extended CRF frame is received and performing the frequency adjustment to the own gPTP clock counter 39.

The node B can start the media clock synchronization at a stage where the above-described the gPTP clock initial synchronization is established between the nodes A and B. Since the gPTP clock synchronization is maintained by consecutively delivering the extended CRF frame, a state where the media clocks are in synchronization can also be maintained. In other words, in a state where the gPTP clock synchronization is established between the nodes A and B as described above, the media clock synchronization can be performed by using the crf_data field of a CRF frame.

Accordingly, thereafter, AVTP (audio video transport protocol) data including the audio data and the video data is transmitted from the master node A, and the audio data and the video data are correctly reproduced at each of the slave nodes B and C.

Note that although the extended CRF frame is used to perform the gPTP clock synchronization and the media clock synchronization in the above-described embodiment, another frame such as an AVTP frame may be used in place of the extended CRF frame.

Figure 10:
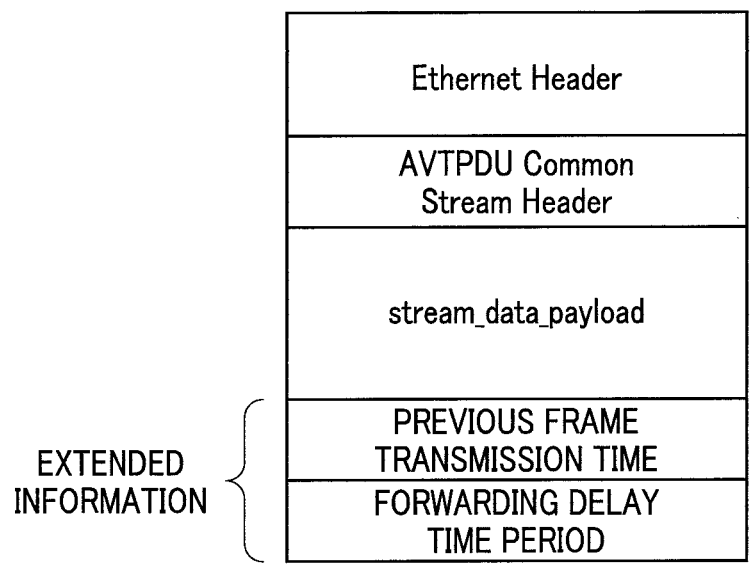
FIG. 10 is a diagram showing a structure of an extended AVTP frame, according to the first embodiment.

FIG. 10 is a diagram showing a structure of an extended AVTP frame. The extended AVTP frame includes an Ethernet header field, an AVTPDU Common Stream Header field, a stream_data_payload field, and an extended information field. The extended information field includes the previous frame transmission time field and the forwarding delay time period field similarly to the extended information field shown in FIG. 2.

The above-described gPTP clock synchronization and media clock synchronization can also be performed by using the extended AVTP frame containing the audio data and the video data, without transmitting and receiving the CRF frame.

As described above, according to the above-described embodiment, the network system, the transmission apparatus, and the reception apparatus can be achieved that make it possible to promptly perform the clock synchronization between apparatuses before a protocol for the time synchronization runs, or in a situation where a protocol for the time synchronization does not run.

Second Embodiment

In the first embodiment, the switch SW includes a function of rewriting a forwarding delay time period in the CRF frame. In a second embodiment, a switch SWc does not rewrite the forwarding delay time period in the CRF frame.

The second embodiment relates to a clock synchronization method in a case (early audio) where, for example, in the in-the-vehicle network or the like, the audio data such as an announcement message is delivered to the network and reproduced early on after a system is powered on.

Figure 11:
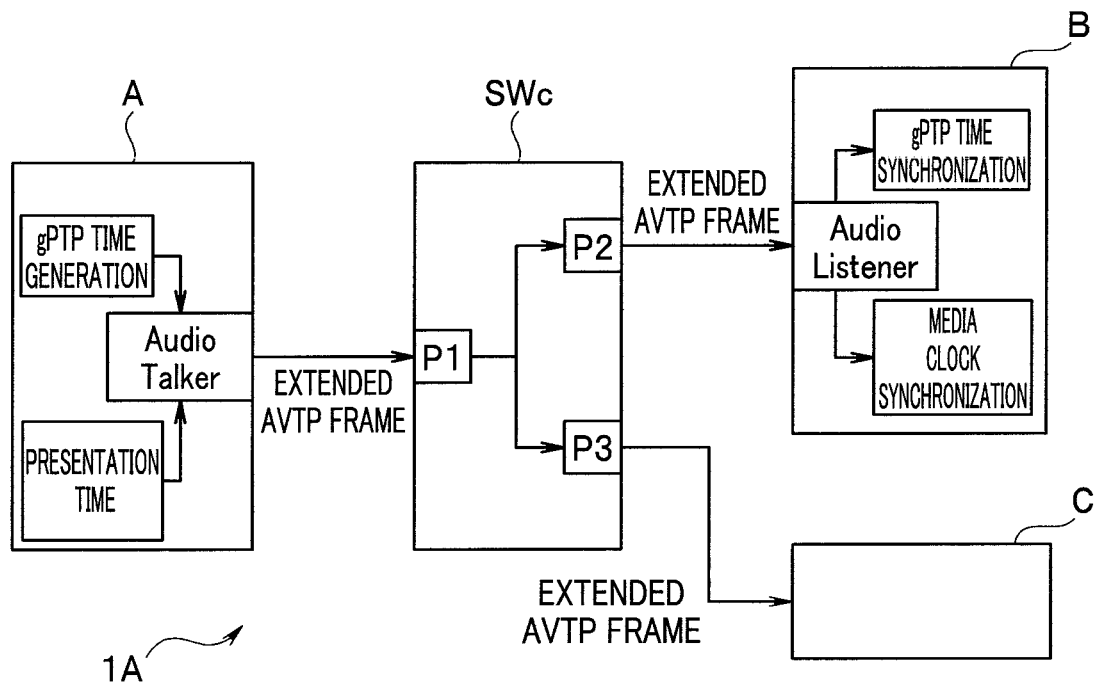
FIG. 11 is a functional block configuration diagram of a network system according to a second embodiment.

FIG. 11 is a functional block configuration diagram of a network system according to the present embodiment. In the present embodiment, a node A also transmits the audio data and the video data to each of nodes B and C, and the audio data and the video data are also reproduced at each of the nodes B and C. The node A includes a presentation time function serving as a time reference for recording, reproduction, and the like of the audio data and the video data, a gPTP time generation function, and an audio talker function.

Configurations of the each node and the switch SWc in the present embodiment are approximately similar to the configurations of the each node and the switch SW in the first embodiment, and a description is therefore omitted. However, in the present embodiment, the switch SWc does not include a function of measuring the forwarding delay time period and rewriting the extended information as illustrated in the first embodiment. Non-inclusion of the function is based on a premise that when network traffic immediately after the network system 1A is activated includes no packets other than audio packets as in a case of early audio reproduction, a total sum of propagation delays over a path including a forwarding delay at the switch SWc (S[n] in FIG. 13) can be calculated, or estimated, with sufficient accuracy at an end point on the AVTP frame receiving side (that is, the nodes B, C).

Figure 12:
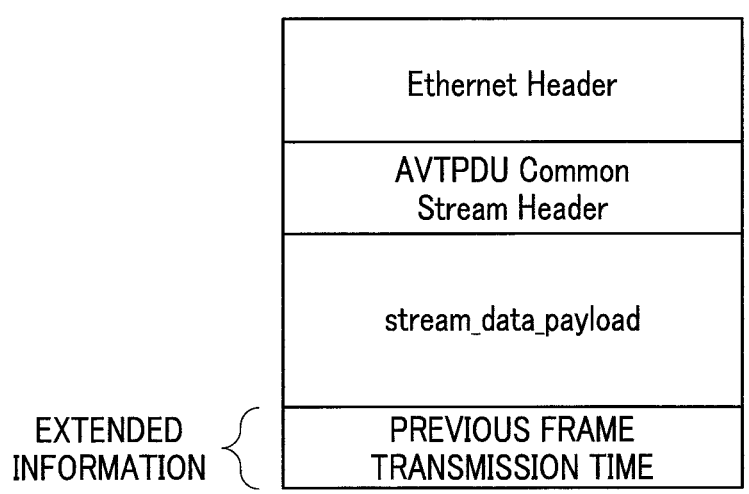
FIG. 12 is a diagram showing a structure of an extended AVTP frame, according to the second embodiment.

FIG. 12 shows a structure of an extended AVTP frame. The extended AVTP frame is based on IEEE 1722-2016 4.4.4 and includes an Ethernet header field, an AVTPDU Common Stream header field, a stream_data_payload field, and an extended information field. The extended information field includes a previous frame transmission time field.

As shown in FIG. 11, the node A, as an audio talker, stores media data in an extended AVTP frame as shown in FIG. 12 and transmits the extended AVTP frame to the switch SWc. The switch SWc delivers the received extended AVTP frame toward each of the nodes B and C.

Figure 13:
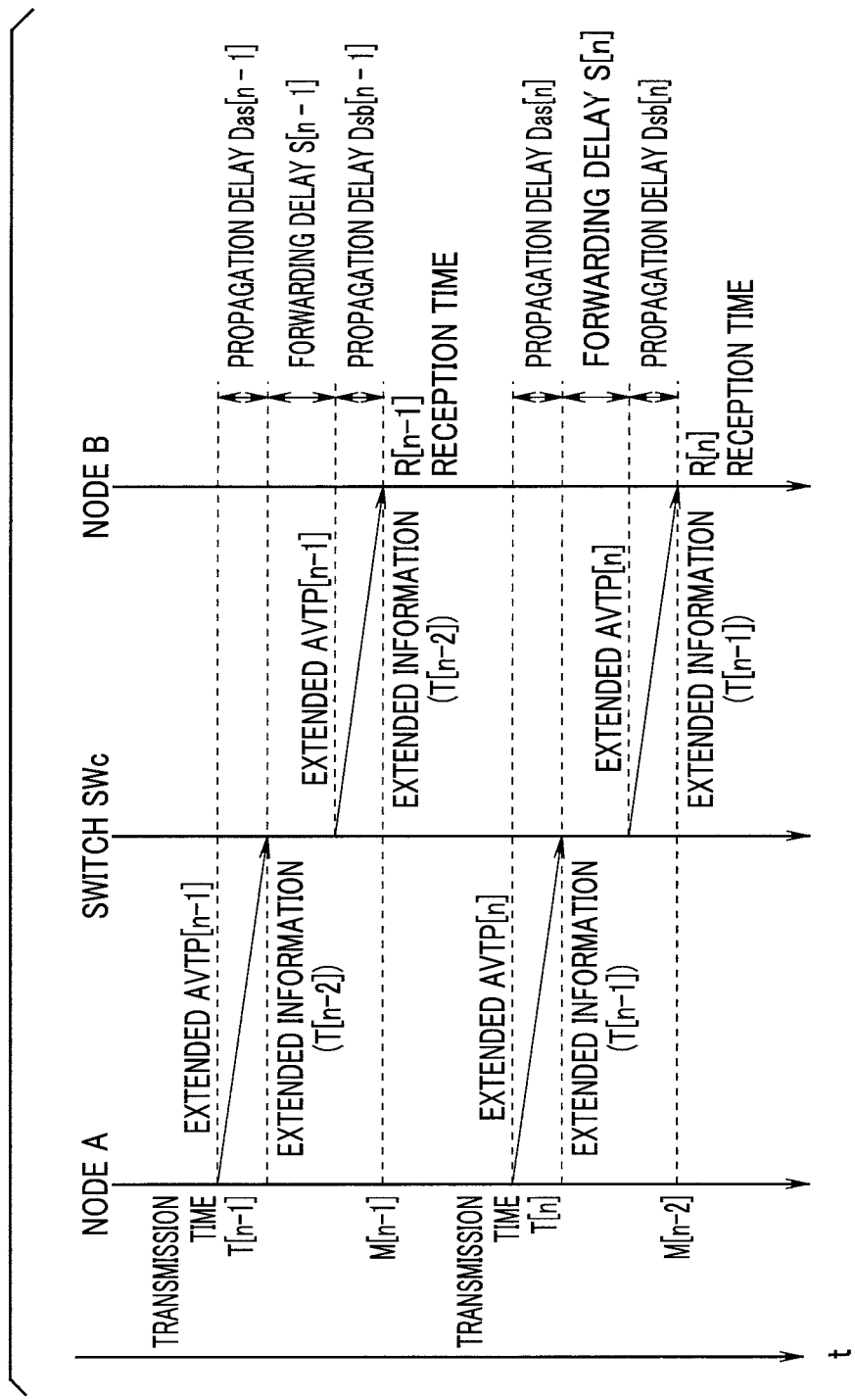
FIG. 13 is diagram showing how the extended AVTP frame delivered from a transmission apparatus is propagated to a reception apparatus, according to the second embodiment.

FIG. 13 is a diagram showing how the extended AVTP frame delivered from the node A is propagated to the node B in the network system 1A shown in FIG. 11. In FIG. 13, passage of a time period t goes from the top to the bottom of the figure.

The node A transmits, at a transmission time T[n], the extended AVTP frame[n] in which T[n−1] is stored in the previous frame transmission time field. In the event, similarly to the ordinary AVTP frame, media data Md to be reproduced at the listener-side nodes B and C is stored in the stream_datapay_load field, and a timestamp indicating a reproduction timing is stored in the avtp_timestamp field in the AVTPDU Common Stream header. A reference time for a timestamp is a local gPTP time in the node A.

At the switch SWc, when the extended AVTP frame[n] is received, the switch SWc forwards the extended AVTP frame[n] to the node B (and the node C). As described above, it is premised that a forwarding delay time period S[n] then occurring can be calculated or estimated on the node B side.

At the node B, when the extended AVTP frame[n] is received, the gPTP clock synchronization can be performed through a method similar to the method illustrated in the first embodiment. However, in general, an AVTP frame transmission interval (125 μsec or the like) is shorter than a CRF frame transmission interval (20 msec or the like). In such a case, it is effective, in terms of reducing an error in calculation and jitter in a generated clock, that a time information evaluation interval is lengthened by, for example, performing processing when every N-th frame is received.

Once the gPTP clock synchronization is established, the media clock synchronization can also be achieved as in the first embodiment, based on a plurality of avtp_timestamp information pieces.

As described above, according to each of the above-described embodiments, a network system, a transmission apparatus, and a reception apparatus can be achieved that make it possible to promptly perform clock synchronization between apparatuses before a protocol for time synchronization runs, or in a situation where a protocol for time synchronization does not run.

While certain embodiments have been described, these embodiments have been presented by way of example only, and are not intended to limit the scope of the inventions. Indeed, the novel systems, devices and methods described herein may be embodied in a variety of other forms; furthermore, various omissions, substitutions and changes in the form of the systems, devices and methods described herein may be made without departing from the gist of the inventions. The accompanying claims and their equivalents are intended to cover such forms or modifications as would fall within the scope and spirit of the inventions.

What is claimed is:

1. A network system in which at least one data of the audio data and the video data is transmitted from a first apparatus to a second apparatus through a network,
wherein the first apparatus comprises:
a first current time keeping circuit configured to keep a first current time;
a first clock generation circuit configured to generate a first clock signal for reproduction of the at least one data; and
a first processor configured to transmit a predetermined frame at a first timing, and to transmit, to the second apparatus through the network at the first timing, the predetermined frame containing a transmission time that is based on the first current time and at which the predetermined frame is transmitted at a second timing that is previous to the first timing, and
the second apparatus comprises:
a second current time keeping circuit configured to keep a second current time;
a second clock generation circuit configured to generate a second clock signal for reproduction of the at least one data; and a second processor configured to receive the predetermined frame through the network, and to synchronize the second current time with the first current time based on the transmission time contained in the predetermined frame, a reception time that is based on the second current time and at which the predetermined frame transmitted at the second timing is received at a third timing, and a delay time period that is contained in the predetermined frame and occurs while the predetermined frame is transmitted from the first apparatus to the second apparatus through the network.

2. The network system according to claim 1, wherein the second processor synchronizes the second current time with the first current time by using a difference between a time obtained by adding the delay time period to the transmission time, and the reception time.

3. The network system according to claim 2, wherein the second processor synchronizes a clock frequency of the second current time keeping circuit configured to keep the second current time with a clock frequency of the first current time keeping circuit configured to keep the first current time, by using a plurality of the transmission times contained in the plurality of predetermined frames received on a plurality of occasions, a plurality of the reception times at which the plurality of predetermined frames are received, and the difference.

4. The network system according to claim 1, comprising a switch that is provided on the network and is configured to forward the predetermined frame,
wherein the delay time period includes a forwarding delay time period occurring at the switch after the predetermined frame from the first apparatus is received and before the predetermined frame is transmitted to the second apparatus.

5. The network system according to claim 4, wherein the switch includes a third processor configured to measure the forwarding delay time period.

6. The network system according to claim 5,
wherein the predetermined frame includes a field in which the forwarding delay time period is stored, and
the third processor updates the forwarding delay time period in the field by using the measured forwarding delay time period.

7. The network system according to claim 1,
wherein the predetermined frame contains a plurality of first timing times acquired at a first time interval based on the first clock signal, and
the second processor synchronizes the second clock signal with the first clock signal such that a clock timing of the second clock signal coincides with a clock timing of the first clock signal, based on the plurality of first timing times contained in the predetermined frame, and a plurality of second timing times acquired at a second time interval that is based on the second clock signal and is equal to the first time interval.

8. The network system according to claim 1, wherein the predetermined frame is a CRF (clock recovery format) frame or an AVTP (audio video transport protocol) frame.

9. A transmission apparatus configured to transmit at least one data of the audio data and the video data through a network, comprising:
a current time keeping circuit configured to keep a current time;
a clock generation circuit configured to generate a clock signal for reproduction of the at least one data; and
a processor configured to transmit a predetermined frame at a first timing, and to transmit, through the network at the first timing, the predetermined frame containing a transmission time that is based on the current time and at which the predetermined frame is transmitted at a second timing that is previous to the first timing and the predetermined frame containing a delay time period that occurs while the predetermined frame is transmitted through the network.

10. The transmission apparatus according to claim 9, wherein the predetermined frame is a CRF (clock recovery format) frame or an AVTP (audio video transport protocol) frame.

11. A reception apparatus configured to receive at least one data of the audio data and the video data from a transmission apparatus through a network, comprising:
a first current time keeping circuit configured to keep a first current time;
a first clock generation circuit configured to generate a first clock signal for reproduction of the at least one data; and
a processor configured to receive a predetermined frame from the transmission apparatus through the network, and to synchronize the first current time with a second current time in the transmission apparatus, based on a transmission time that is contained in the predetermined frame, that is based on the second current time in the transmission apparatus, and that is a second timing previous to a first timing at which the transmission apparatus transmits the predetermined frame, a reception time that is based on the first current time and at which the predetermined frame transmitted at the second timing is received at a third timing, and a delay time period that is contained in the predetermined frame and occurs while the predetermined frame is transmitted from the transmission apparatus to the reception apparatus through the network.

12. The reception apparatus according to claim 11, wherein the processor synchronizes the first current time with the second current time in the transmission apparatus by using a difference between a time obtained by adding the delay time period to the transmission time, and the reception time.

13. The reception apparatus according to claim 12, wherein the processor synchronizes a clock frequency of the first current time keeping circuit configured to keep the first current time with a clock frequency of a second current time keeping circuit configured to keep the second current time in the transmission apparatus, by using a plurality of the transmission times contained in the plurality of predetermined frames received on a plurality of occasions, a plurality of the reception times at which the plurality of predetermined frames are received, and the difference.

14. The reception apparatus according to claim 11,
wherein the predetermined frame contains a plurality of first timing times acquired at a first time interval based on a second clock signal of the transmission apparatus, and
the processor synchronizes the first clock signal with the second clock signal such that a clock timing of the first clock signal coincides with a clock timing of the second clock signal, based on the plurality of first timing times contained in the predetermined frame, and a plurality of second timing times acquired at a second time interval that is based on the first clock signal and is equal to the first time interval.

15. The reception apparatus according to claim 11, wherein the predetermined frame is a CRF (clock recovery format) frame or an AVTP (audio video transport protocol) frame.

\* \* \* \* \*